US009867381B2

(12) United States Patent
Sosebee et al.

(10) Patent No.: US 9,867,381 B2
(45) Date of Patent: Jan. 16, 2018

(54) METHOD FOR PREPARING POULTRY AND MEAT PRODUCTS

(71) Applicant: MAS Marketing Holding Company, LLC, Dawsonville, GA (US)

(72) Inventors: Mark Sosebee, Gainesville, GA (US); Mike Ensley, Epworth, GA (US); Dung Dinh, Gainesville, GA (US); Gordon Tatro, Gainesville, GA (US)

(73) Assignee: MAS Marketing Holding Company, LLC, Dawsonville, GA (US)

( * ) Notice: Subject to any disclaimer, the term of this patent is extended or adjusted under 35 U.S.C. 154(b) by 69 days.

(21) Appl. No.: 13/782,292

(22) Filed: Mar. 1, 2013

(65) Prior Publication Data

US 2015/0342203 A1    Dec. 3, 2015

Related U.S. Application Data

(60) Provisional application No. 61/605,688, filed on Mar. 1, 2012.

(51) Int. Cl.
*A22C 21/00*    (2006.01)
*A23L 1/315*    (2006.01)
*A23L 1/31*    (2006.01)

(52) U.S. Cl.
CPC .............. *A22C 21/003* (2013.01); *A23L 1/31* (2013.01); *A23L 1/315* (2013.01); *A23L 1/3155* (2013.01)

(58) Field of Classification Search
CPC ....... A22B 5/0017; A22B 5/0029; A22B 5/20; A22C 17/002; A22C 17/0073; A22C 21/003; A22C 25/18

USPC ....... 452/149, 150, 152, 153, 155, 156, 157, 452/160, 161

See application file for complete search history.

(56) References Cited

U.S. PATENT DOCUMENTS

| 5,094,650 | A | * | 3/1992 | Schmidt | B26D 7/32 452/161 |
|---|---|---|---|---|---|
| 5,370,573 | A | * | 12/1994 | Warren | A22C 21/0023 452/149 |
| 5,569,070 | A | * | 10/1996 | Smith | A22C 17/002 425/518 |
| 6,383,068 | B1 | * | 5/2002 | Tollett | A22C 21/003 452/149 |
| 7,134,958 | B2 | * | 11/2006 | Gagliardi, Jr. | A22C 21/0023 452/149 |
| 7,204,748 | B2 | * | 4/2007 | Gasbarro | A22C 21/0023 452/149 |
| 7,384,330 | B1 | * | 6/2008 | Picanco | A22C 25/166 452/58 |

(Continued)

FOREIGN PATENT DOCUMENTS

DE    3145981    *    6/1983

*Primary Examiner* — David Parsley
(74) *Attorney, Agent, or Firm* — Smith, Gambrell & Russell

(57) ABSTRACT

A method for preparing a meat or poultry product includes placing a product having a thick edge and an opposing thin edge on a flat surface and creating an incision in the thick edge of the product along a line that falls approximately midway between an upper surface and a lower surface, the incision lying in a plane that cuts the product into a first fillet portion and a second fillet portion connected by a center portion each with substantially uniform thickness.

10 Claims, 5 Drawing Sheets

(56) References Cited

U.S. PATENT DOCUMENTS

2009/0047886 A1* 2/2009 O'Neil .................. A22C 17/02
452/160

* cited by examiner

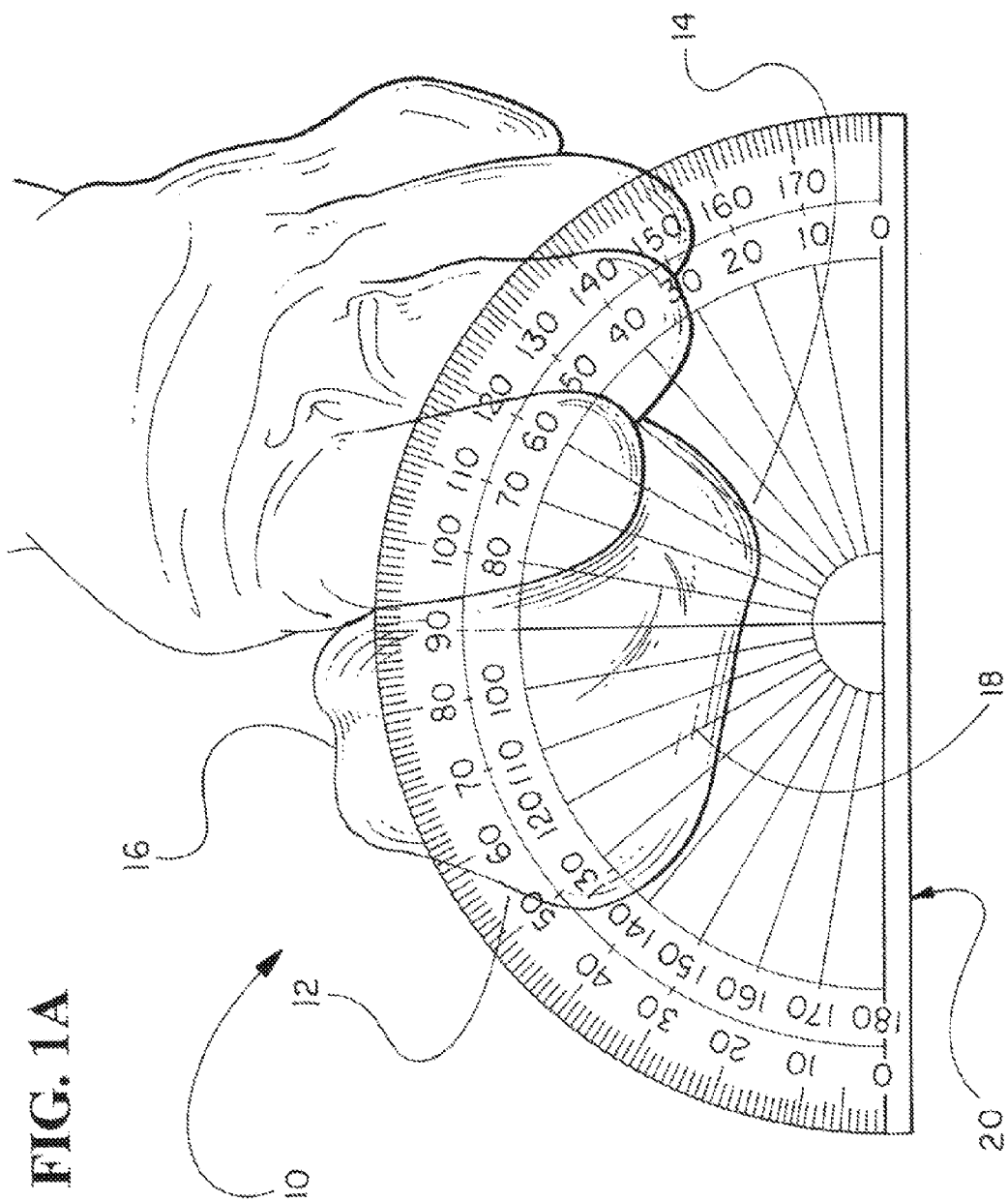

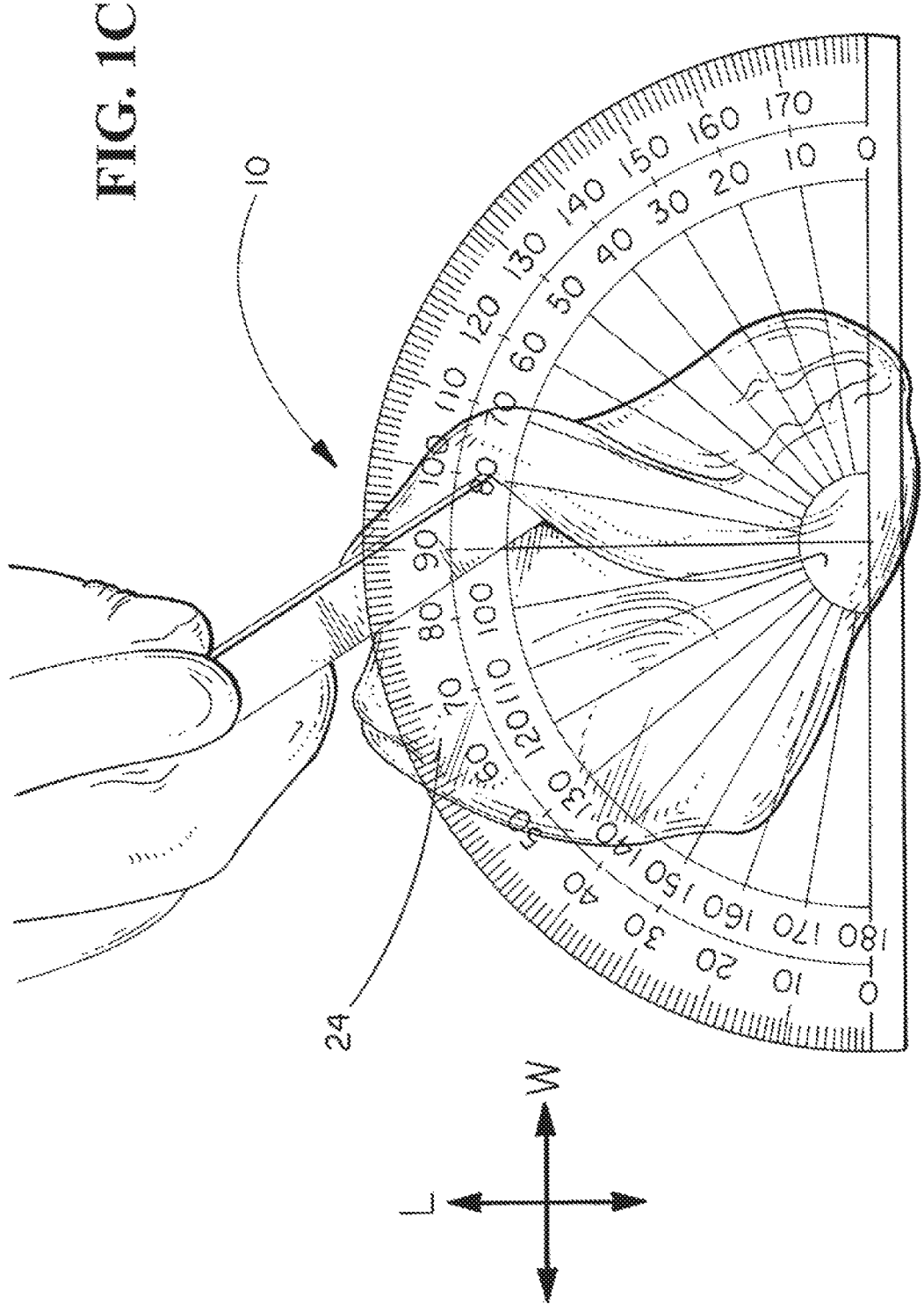

METHOD FOR PREPARING POULTRY AND MEAT PRODUCTS

PRIORITY CLAIM

This application claims priority from U.S. Provisional Patent Application No. 61/605,688 filed on Mar. 1, 2012, which is relied upon and incorporated herein in its entirety by reference.

FIELD OF INVENTION

The present invention relates to a method for preparing meat and/or poultry products. In particular, the present invention is directed to a method for preparing a tenderloin product having increased surface area, reduced thickness, and/or increased uniformity of thickness.

BACKGROUND

Food safety guidelines call for cooking poultry products to a safe minimum internal temperature of 165° F. (about 74° C.) and cooking most beef, pork and other red meats, other than organ meats, the a safe minimum internal temperature of 145° F. (about 63° C.) as measured using a food thermometer. Typically, such temperature measurements are taken at the thickest portion of the poultry or meat product. However, poultry products such as chicken or turkey breasts or tenders and beef or pork tenderloins can have irregular shapes which often vary in thickness. As a result, some portions of the poultry or meat may be over cooked while other portions may be undercooked resulting in a food product that is less palatable. Additionally, due to variations in thickness cooking times may be prolonged or extended in order to achieve the safe minimum internal cooking temperatures. Such prolonged cooking times may also result in a meat or poultry product having a less palatable texture or taste due to loss of moisture and/or degradation of the proteins.

Accordingly, there is a need and a desire for a method for preparing poultry and/or meat products having reduced thickness. There is an additional need and desire for a meat or poultry product having increase uniformity of thickness. There is a further need for a poultry and/or meat product having an increased surface area.

SUMMARY OF THE INVENTION

A general object of the invention is to provide a method for preparing poultry and/or meat products.

A more specific object is to provide a method for preparing poultry, and/or meat products having a more uniform thickness, reduced overall thickness, and/or increased surface area.

In one embodiment, a poultry or meat fillet or is prepared by placing a poultry or meat product having a thick edge opposite a thin edge on a flat surface, contacting the thick edge of the poultry or meat product with a cutting instrument, and making an incision through the poultry or meat product from the thick edge toward, but not through, the thin edge at an angle of about 45° to about 55° as measured from the flat surface. The incision extends through the poultry or meat product to provide a fillet or cutlet having two halves of substantially equal thickness.

In accordance with another embodiment, a method for preparing a chicken fillet having uniform thickness includes placing a chicken tender or tenderloin having a thick edge opposite a thin edge on a flat surface, contacting the thick edge of the tender or tenderloin at a point midway between an upper surface of the tender or tenderloin and a lower surface of the tender or tenderloin with a knife, making an incision extending along the length, across the width, and through the tender or tenderloin from the thick edge toward, but not through, the thin edge, and spreading the cut tender open lengthwise along the incision to provide a chicken fillet having a uniform thickness. The incision can extend through the tender at an angle of about 45° to about 55° as measured from the flat surface.

BRIEF DESCRIPTION OF THE DRAWINGS

FIGS. 1A-E depict a process for preparing poultry fillet as described herein.

DETAILED DESCRIPTION

Figure 1B:
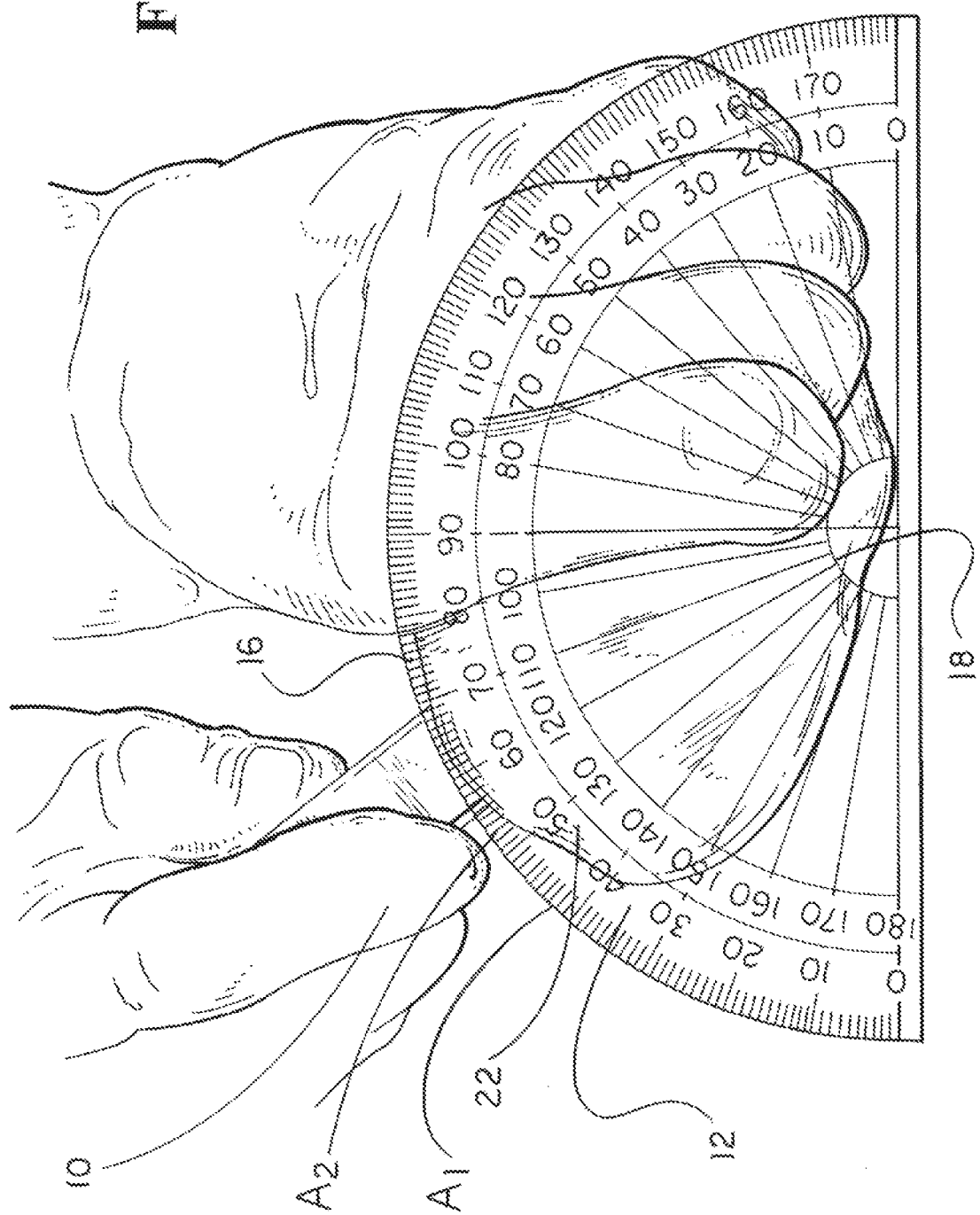

One or more of the above objects can be achieved, at least in part, by utilizing a unique method for cutting or slicing a poultry or meat tenderloin, tender, strip and/or finger to allow the meat or poultry product to have the appearance of a breast fillet or meat cutlet. For example, a poultry tenderloin such as a chicken tenderloin when cut according to the methods described herein will generally have an teardrop-like shape and a more uniform thickness.

As used herein the term "tenderloin" when used in connection with poultry products refers to a muscle portion located under and weakly attached to the breast of the bird. Depending upon the species and size of the bird, poultry tenderloins can have an average length of about 3 inches (about 7.6 cm) to about 10 inches (about 25.4 cm), or more in some cases, and an average width from a thick edge to an opposite thin edge of about 0.75 inch (about 1.9 cm) to about 4 inches (about 10.2 cm).

As used herein the term "tenderloin" when used in connection with beef, pork and other red or game meat products refers to the portion of psoas major muscle ventral to the transverse processes of the lumbar vertebrae, near the kidneys, sitting beneath the ribs and adjacent to the backbone of the animal. The tenderloin is generally oblong in shape having a smaller thinner tail and thicker opposing end often referred to as the sirloin.

In accordance with one embodiment, a method for preparing a meat or poultry product includes placing a poultry or meat product having a thick edge and an opposing thin edge on a flat surface and contacting the thick edge of the product at a point that falls approximately midway between an upper surface and a lower surface of the product with a cutting implement such as a knife. In accordance with one aspect, the point of contact on the thick edge of the product falls at a height which can be about 45% and about 55% above the lower surface of the product.

From the point of contact, an incision is made along the length of the product, across the width of the product, and extending through the product from the thick edge toward, but not through, the thin edge to form a first fillet portion and a second fillet portion connect by a center portion. In accordance with certain aspect, the incision can be made on a diagonal and at an angle of about 45° to about 55° as measured from the flat surface. Suitable cutting implements include, but are not limited to, knives having an overall length of about 7 to about 12 inches (about 17.8 to about 30.5 cm) and blade length of about 4 to about 6 inches (about 10.1 to about 15.2 cm).

After the incision is made, the sliced product can be opened or spread apart along the length of the incision to provide a poultry or meat fillet having two substantially equally sized halves. In one aspect, the extent incision does not exceed a point at which the center portion of the poultry or meat fillet has a thickness which is less than a thickness of an outer edge of the first or second fillet portion. In another aspect, the incision can extend across about 80% to about 90% of the width of the poultry or meat product to form the first and second fillet portions and wherein the remaining about 10% to about 20% of the width of the meat or poultry product forms the center portion of the of the poultry or meat fillet.

In accordance with a further embodiment, poultry or meat products prepared in accordance with the methods described herein have a more uniform thickness. Suitably, the thickness of a first portion of the poultry or meat fillet does not exceed the thickness of the second portion of the poultry or meat fillet. In one aspect, the difference between a first thickness measured at an outer edge of the first portion of the fillet and a second thickness measured at an outer edge of the second portion of the fillet is less than or equal to about 0.125 inches (about 0.3 cm).

Figure 1D:
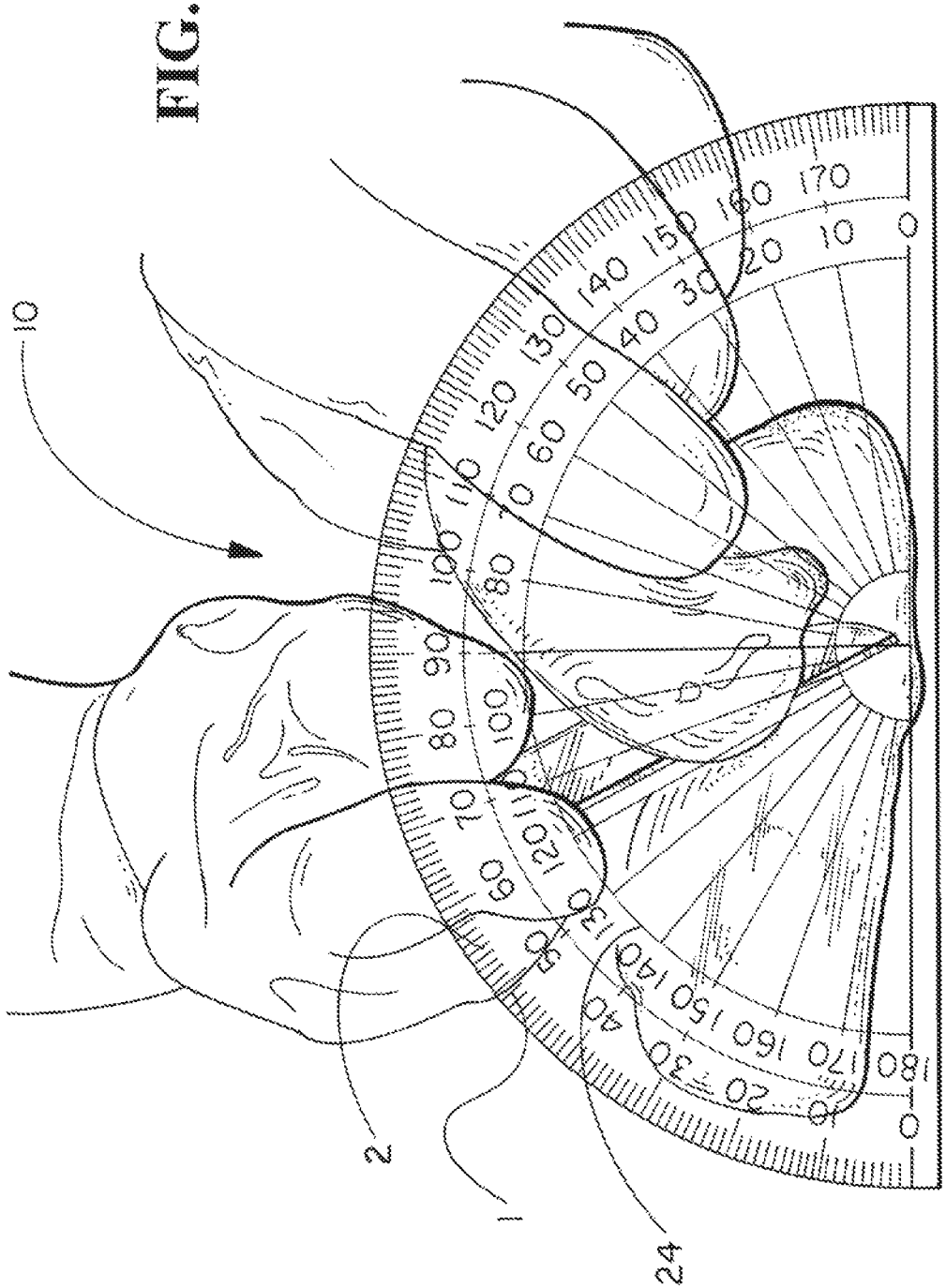
Figure 1E:
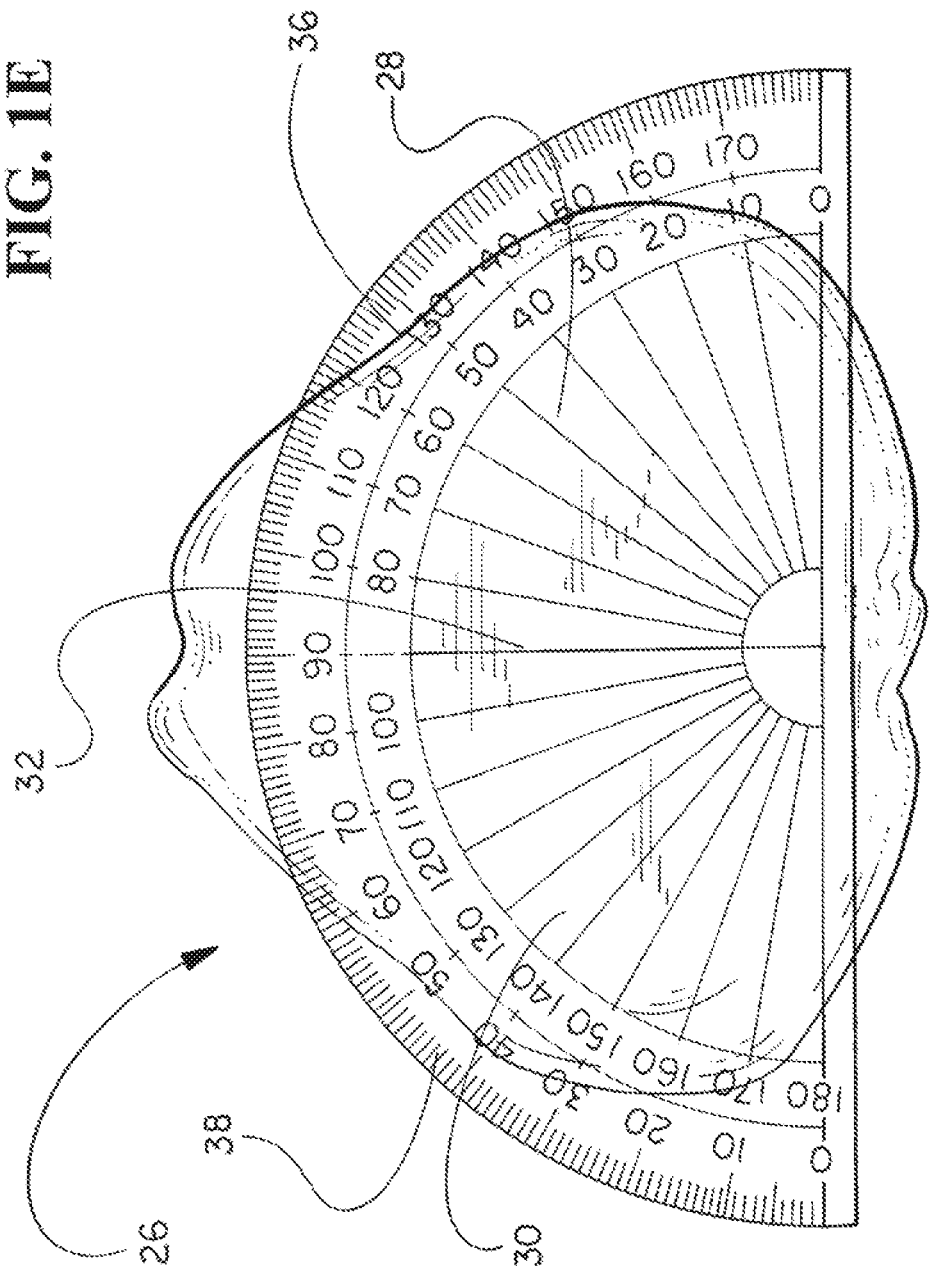

In accordance with another embodiment, a method for preparing a chicken fillet having uniform thickness, as shown in FIGS. 1A-1E, includes: (1) placing a chicken tenderloin 10 having a thick edge 12 opposite a thin edge 14 on a flat surface 20; (2) contacting the thick edge 12 of the tenderloin 10 at a point 22 midway between an upper surface 16 of the tenderloin 10 and a lower surface 18 of the tenderloin 10 (e.g., at a height of about 45% to about 55% of the thick edge 12 as measured from the flat surface 20) with a knife or other cutting implement; (3) making an incision 24 extending along the length (L), across the width (W), and through the tenderloin 10 from the thick edge 12 toward, but not through, the thin edge 14; and (4) spreading the cut tender open lengthwise along incision 24 to provide a chicken fillet 26 having a first portion 28 and a second portion 30 connected by a center portion 32. Suitably, the incision extends through the tender at an angle (A1, A2) of about 45° to about 55° as measured from the flat surface 20. In one aspect, a difference between a first thickness measured at an outer edge 34 of the first portion 28 of the fillet 26 and a second thickness measured at an outer edge 36 of the second portion 30 of the fillet is less than or equal to about 0.125 inches (about 0.3 cm).

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

What we claim is:

1. A method of preparing a meat product from an irregularly shaped meat product, the irregularly shaped meat product having an upper surface, a lower surface, a thick edge with a thickness, and an opposing thin edge comprising the steps of:

a. placing the irregularly shaped meat product on a flat surface;
   b. creating an incision in the irregularly shaped meat product along a line on said thick edge that falls between 45% and 55% of the thickness of the thick edge above the lower surface of the irregularly shaped meat product;
   c. continuing the incision within the irregularly shaped meat product along a plane so that the incision alone yields a single first fillet portion and a single second fillet portion, connected by a center portion, on opposite sides of the incision, wherein the first fillet portion and the second fillet portion have substantially the same thickness;
   d. terminating the incision within the irregularly shaped meat product at a selected distance from the thin edge and spreading the portions of the irregularly shaped meat product open lengthwise along the incision, wherein the selected distance results in the meat product having an overall reduced thickness and wherein the selected distance results in the meat product having an increased surface area as compared to the irregularly shaped meat product.

2. The method of claim 1, wherein said incision is created by slicing into the irregularly shaped meat product in a direction from the thick edge toward the thin edge.

3. The method of claim 1, further comprising opening said meat product along said incision to form a fillet of meat having a substantially uniform thickness.

4. The method of claim 3, wherein said incision forms said center portion with a thickness substantially equal to a thickness of an outer edge of the first or second fillet portion.

5. The method of claim 1, wherein said incision forms the center portion with a thickness which is no less than a thickness of an outer edge of the first or second fillet portion.

6. The method of claim 1, wherein said plane is defined along an angle of about 45° to about 55° as measured from the flat surface.

7. A method for preparing a meat product from an irregularly shaped meat product comprising placing the irregularly shaped meat product having a thick edge with a thickness and an opposing thin edge on a flat surface, creating an incision in the thick edge of the irregularly shaped meat product along a line that falls between 45% and 55% of the thickness of the thick edge above a lower surface of the irregularly shaped meat product, the incision lying in a plane that alone cuts the meat product into a single first fillet portion and a single second fillet portion connected by a center portion, each portion, the first fillet portion, the second fillet portion, and the center portion, with substantially uniform thickness relative to each other portion.

8. The method of claim 7, wherein said plane is defined along an angle of about 45° to about 55° as measured from the flat surface.

9. The method of claim 8, wherein said incision forms said center portion with a thickness substantially equal to a thickness of an outer edge of the first or second fillet portion.

10. The method of claim 8, wherein said incision is created by slicing into the product in a direction from the thick edge toward the thin edge.

* * * * *